July 15, 1952 J. I. KERN 2,603,702
INDICATING APPARATUS
Filed Jan. 21, 1950 3 Sheets-Sheet 1

INVENTOR
JACK I. KERN
BY *Earl Bernt*
*Louis A. Kline*
HIS ATTORNEYS

July 15, 1952  J. I. KERN  2,603,702
INDICATING APPARATUS
Filed Jan. 21, 1950  3 Sheets-Sheet 3
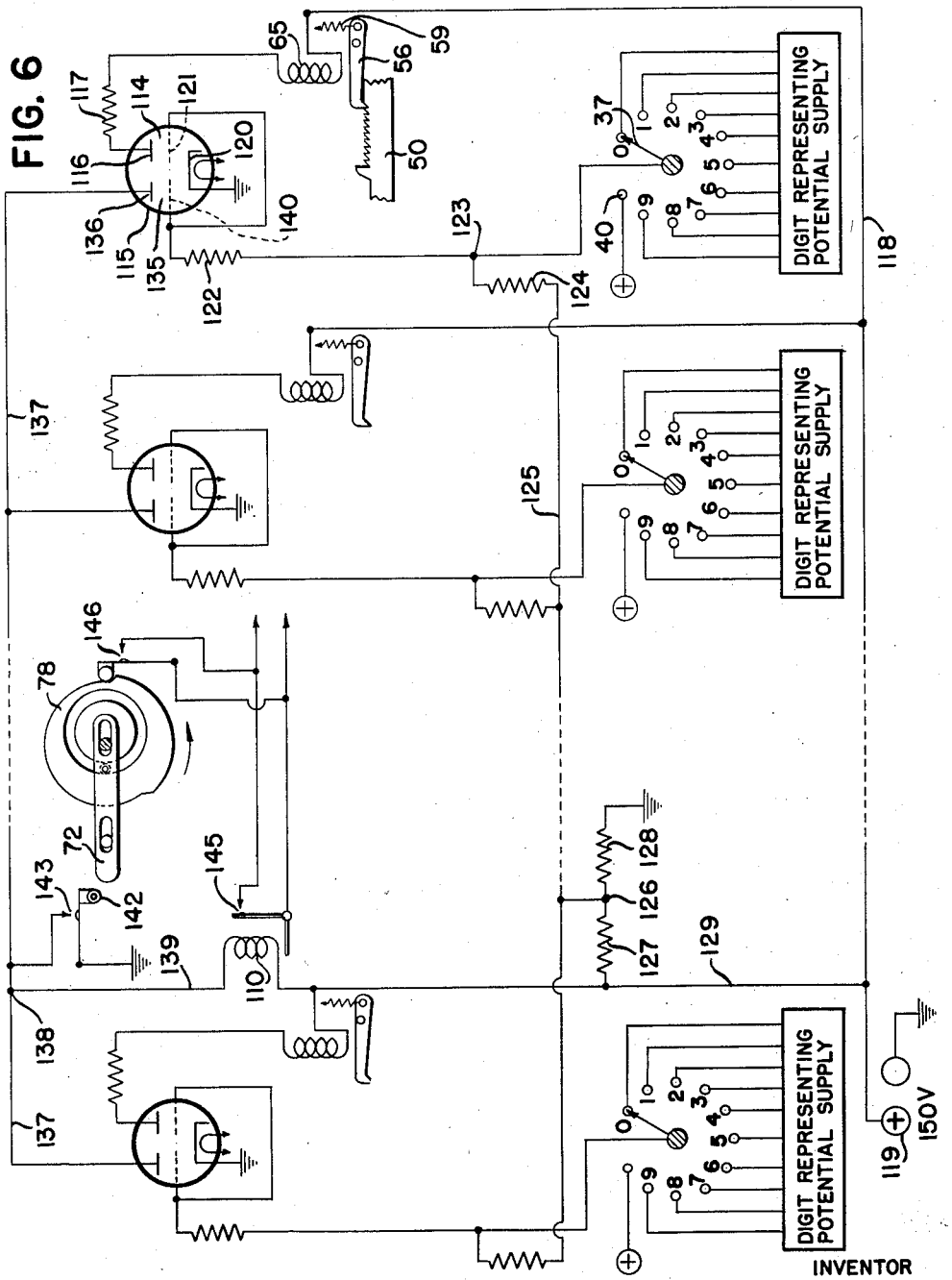
INVENTOR
JACK I. KERN
BY Earl Beust
Louie A. Kline
HIS ATTORNEYS Patented July 15, 1952

2,603,702

UNITED STATES PATENT OFFICE 2,603,702

INDICATING APPARATUS

Jack I. Kern, Dayton, Ohio, assignor to The National Cash Register Company, Dayton, Ohio, a corporation of Maryland Application January 21, 1950, Serial No. 139,817

11 Claims. (Cl. 177—337)

This invention relates to a novel indicating mechanism and controls therefor.

The embodiment of indicating means which is to be described to illustrate the invention is largely of mechanical construction with electrical controls whereby the potential of data-representing points can be sensed and utilized to cause the indicating means to display data corresponding to points which have a distinctive control potential applied thereto. The indicating means is operable cyclically by a driving means, and, in the first part of each cycle, the indicating means is restored to a predetermined condition, and thereafter it is controlled to set up and display the data as required.

In order to explain the invention, an indicating means for indicating amounts in the decimal notation will be described, but it will be obvious that the indicating means can be arranged to indicate other data, if desired.

The indicating means is made small and compact and is capable of operating very rapidly. The means for indicating the digits of a particular denominational order of an amount is of unit construction, so that the various mechanisms which cooperate to indicate the digits can readily be removed as a unit to be serviced or to be replaced. The unit construction also enables indicating means of desired capacities to be built up by bringing together the desired number of units.

The novel controls for the indicating means enable a distinctive potential, which is applied to a digit-representing point, to cause an indicating element to be arrested to display the corresponding digit. In addition, the controls include a circuit for causing a recycling of the indicating means as soon as the amount to be indicated changes and also for causing a recycling when the indicating element for any order is not in the position called for by the potentials applied to the digit-representing points for that order.

It is an object of the invention to provide a small, compact indicating means which is of light-weight construction and is capable of high-speed operation.

A further object of the invention is to provide an indicating means of unit construction, so that indicating elements thereof and their associated mechanisms can readily be removed for servicing or replacement.

A further object of the invention is to provide an indicating means and controls therefor by which the values of potentials applied to different data-representing points can be sensed to control the indicating means and cause it to display data corresponding to distinctive potentials applied to various ones of said points.

A further object of the invention is to provide a cyclically operable indicating means with a control whereby a difference between the setting of the indicating elements thereof and the controls therefor will cause a recycling of the indicating means.

A further object of the invention is to provide a cyclically operable indicating means with a control whereby a change in the data to be indicated automatically initiates an operation of the indicating means.

With these and incidental objects in view, the invention includes certain novel features of construction and combinations of parts, a preferred form or embodiment of which is hereinafter described with reference to the drawings which accompany and form a part of this specification.

Of the drawings:

Fig. 6 is a circuit diagram showing the electrical circuits whereby the control of the indicating means is effected.

Figure 1:
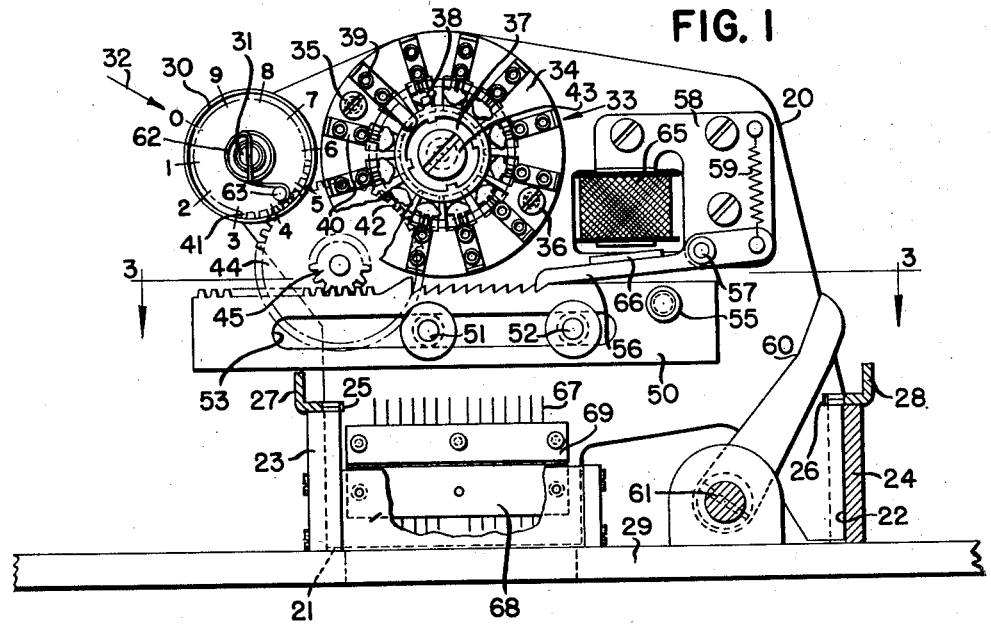
Fig. 1 is a side elevation view of a denominational unit of the indicating means and the drive therefor.
Figure 3:
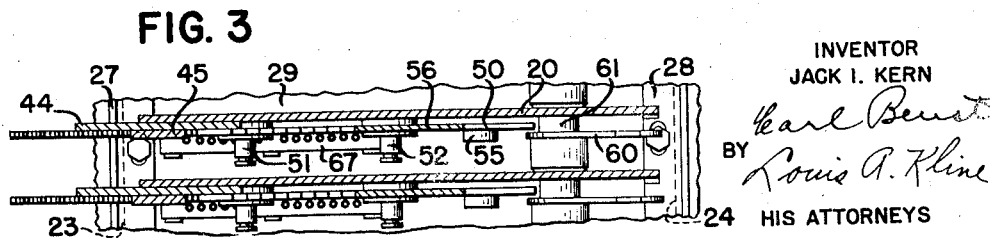
Fig. 3 shows a section of a portion of the indicating means taken along the line 3—3 of Fig. 1, showing the side spacing of the units and the drive therefor and showing the means for securing the units in place.

All of the denominational units of the indicating means are the same, and their construction and operation will be clear from the description of the unit shown in Figs. 1 and 3.

The various elements of the unit are mounted on a plate 20, which can be inserted in slots 21 and 22 in front and back supporting bars 23 and 24, respectively, and which is slotted at 25 and 26 to receive locking plates 27 and 28, which are slidably mounted on the upper edges of the supporting bars. The supporting bars 23 and 24 are mounted in proper spaced relation on a base 29.

The indicating element is a wheel 30, which is mounted for rotation on a stud 31 on the plate 20. The wheel 30 has the numerals "0" and "1" through "9" about its periphery and can be rotated to bring any of these numerals to a reading point, which is indicated by the arrow 32.

Also, mounted on the plate 20 is a scanning switch 33, which has a stator 34 of insulating material secured to the plate 20 by screws 35 and 36, and has a wiper switch 37, which is mounted in the stator for rotation therein, so that a contact element 38 can be moved to engage contacts carried by the stator.

The stator 34 is provided with twelve contacts, contact 39 being extended to serve as a contactor to the wiper switch at all times, and the remaining contacts, considered clockwise, being related to the numerals "0," "1," etc., to "9" and an extra contact 40.

The wheel 30 has a gear 41 secured thereto, and the wiper switch 37 has a gear 42 secured thereto by a screw 43, which gears mesh with gear 44 and enable the wheel and the wiper switch to be moved in unison, the relation between the gears being such that, as the wheel moves from an indication of one numeral to the next, the contact element 38 on the wiper switch will move from engagement with one contact on the stator into engagement with the next contact. For example, if the wheel is moved from the position where "3" is at the reading point to the position where "4" is at the reading point, then the contact element 38 on the wiper switch will move from engagement with the contact related to "3" to the contact related to "4." Gear 44 has secured thereto a smaller gear 45, which meshes with a rack on a setting control member 50.

The setting control member 50 is mounted for movement on suitable guiding and spacing members carried by studs 51 and 52, which are secured to plate 20 and extend through a slot 53 in the member 50.

The setting control member 50 is provided with a roller 55, which is engaged by an arm 60 secured to an operating shaft 61. The arm 60 is rocked first counterclockwise (Fig. 1), in the first portion of a cycle of operation of the indicating means, and then clockwise. As the arm is moved counter-clockwise, it engages the roller 55 in any previously set position of the member and positively restores the member to the left, as viewed in Fig. 1, to restore the wheel 30 and the wiper switch 37, which are geared thereto, counter-clockwise (Fig. 1) a predetermined extent past their "0" positions.

Coiled about the hub portion of the wheel 30 is a spring 62, which has one end anchored in the stud 31, on which wheel 30 rotates, and has its other end engaging a stud 63, which projects from the wheel. Spring 62 is tensioned to turn the wheel clockwise and, through the gears 41, 44, and 45, urge the setting control member 50 to the right, as viewed in Fig. 1.

As the wheel 30 is rotated counter-clockwise (Fig. 1) when it is restored in the first portion of the cycle, the spring 62 will be tensioned further and will store additional energy, which will be utilized to yieldingly drive the wheel clockwise and the control member to the right during the indicator wheel setting portion of the cycle. The spring 62 will tend to maintain the roller 55 in engagement with the arm 60 as the arm is rocked clockwise to its normal position.

The setting control member 50 is provided along its upper edge with the rack with which the gear 45 meshes and is also provided with a series of ratchet teeth, which can be engaged by a pawl 56 in the following manner during the setting portion of the cycle to arrest the member against further movement to thereby set the wheel with the required number at the reading point.

The pawl 56 is pivoted at 57 on a bracket 58, which is secured to the plate 20. A spring 59 normally urges the pawl 56 counter-clockwise (Fig. 1) into engagement with the teeth on the member.

Also mounted on the bracket 58 is a control magnet 65. An armature 66 on the pawl 56 cooperates with the magnet to enable the magnet to control the engagement of the pawl with the ratchet teeth on the member 50.

It should be noted that, when the member 50 is moved to the left (as viewed in Fig. 1) in the restoring operation of the indicating means, the pawl 56 will be cammed clockwise by the ratchet teeth passing thereunder. The magnet 65 is of such a strength that, even when it is energized, it cannot overcome the air gap which is present when the pawl is in the ratchet teeth; consequently it will not be able to pull the pawl 56 out of engagement with the ratchet teeth. However, when energized, it will be effective to attract the pawl and hold it from engagement after the pawl has been cammed to bring the armature 66 close to the pole of the magnet. The magnet 65 will retain the pawl 56 away from the ratchet until, in the setting movement of the member 50, the wiper switch contact element 38, driven thereby, engages a contact corresponding to the numeral to be exhibited, at which time the magnet will be deenergized, in a manner to be explained fully hereinafter, and will release the pawl 56 to the action of spring 59, which moves the pawl into engagement with the required tooth of the ratchet on the member 50. This engagement of the pawl 56 with the ratchet will arrest the member 50 in the position in which wiper switch contact element 38 is engaging the contact having the distinctive potential and the wheel 30, connected thereto, is presenting the required numeral at the reading point 32.

After the pawl has arrested the movement of the setting control member, the continued clockwise movement of the arm 60 will move the arm away from the roller 55.

Plate 20 has thereon a contact block 69, through which all the necessary electrical connections between the elements on the plate and external circuits can be made. In Fig. 1, the connections from the contacts on the stator and from the magnet 65 to pins 67 on the block 69 have been omitted in order to show other mechanisms more clearly.

The pins 67 can be inserted in sockets in the block 68 carried by the base 29, which sockets are connected to external digit-representing potential supplies and other control circuits.

When the plate 20 is to be removed, the connections between the magnet and its control, and between the stator contacts and the circuits for applying potential thereto, can readily be separated at the pin-and-socket connections at blocks 69 and 68.

Driving means

Figure 2:
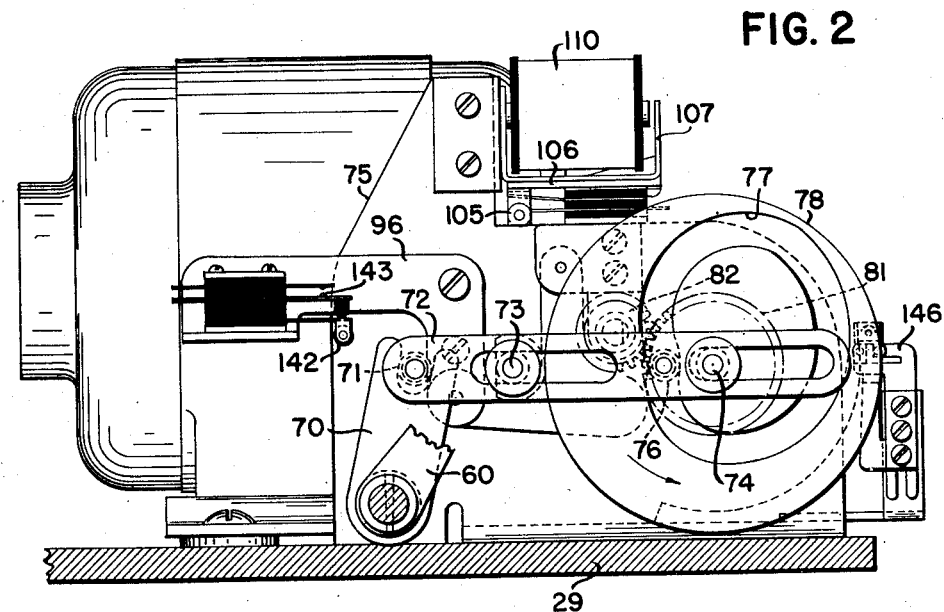
Fig. 2 is a side elevation view of the cam and associated means for operating the drive for the units.
Figure 4:
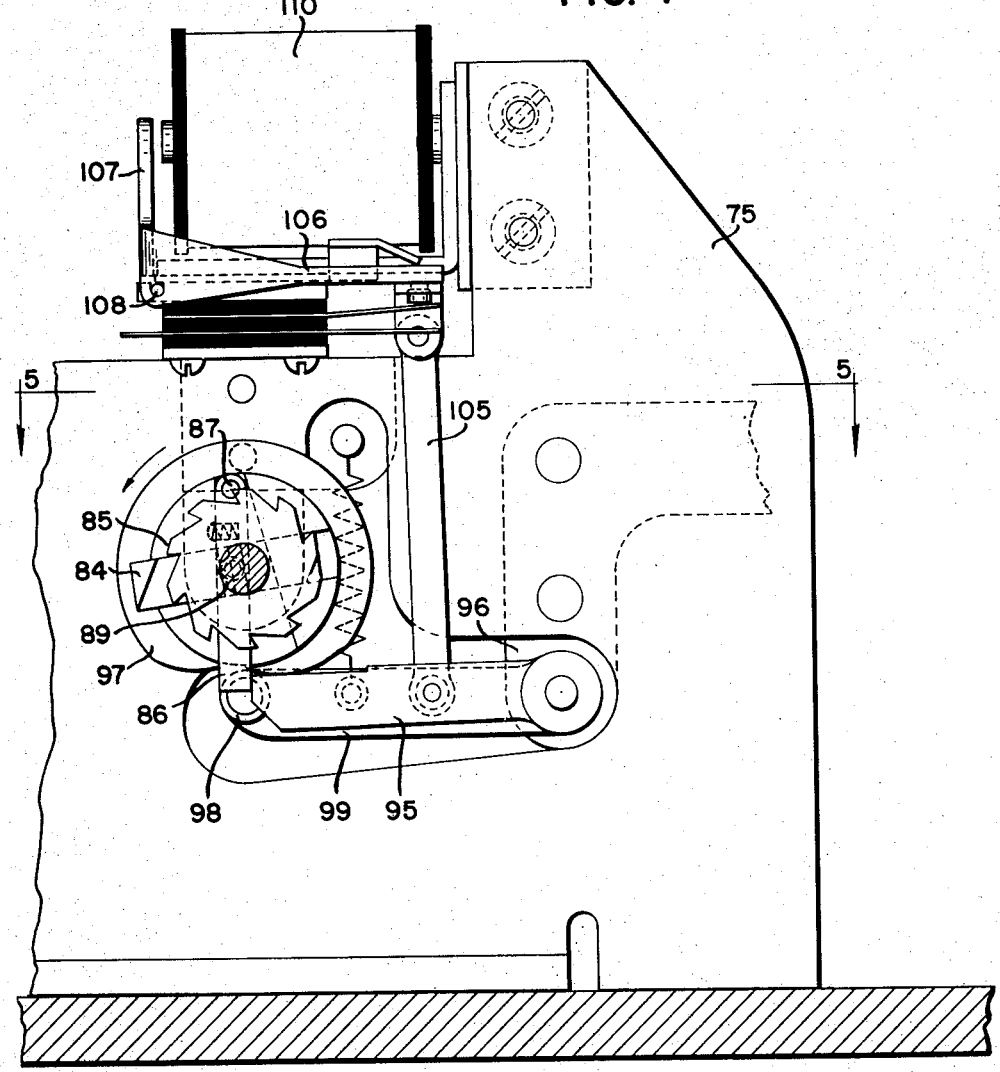
Fig. 4 shows the clutch and its controls for cycling the indicating means.
Figure 5:
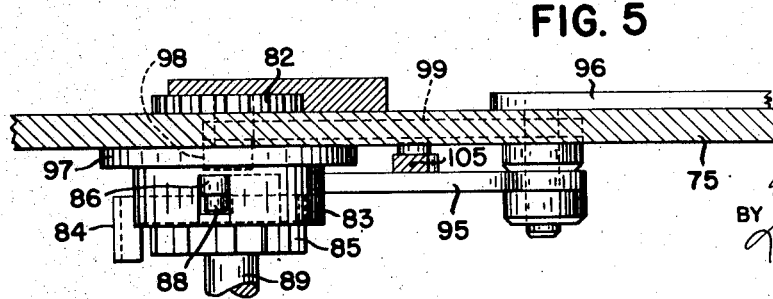
Fig. 5 shows a section taken along the line 5—5 in Fig. 4 and shows the side spacing of certain elements of the clutch.

The means for driving the shaft 61 and the arms 60 thereon first counter-clockwise (Fig. 2) and then clockwise in each cycle of operation of the indicating means is shown in Figs. 2, 4, and 5.

Secured to shaft 61 is an arm 70 (Fig. 2), which has its upper end forked to straddle a roller 71, carried near the end of a pitman 72 mounted on suitable guide means carried by studs 73 and 74 secured in a plate 75 fastened to the base 29.

The pitman 72 carries a roller 76, which extends into a raceway 77 in a box cam 78, which is rotatable about the stud 74. The raceway is so shaped that the pitman 72 will be moved to the left to drive the arms 60 in the restoring operation during the first 120 degrees of rotation of the cam and will be moved to the right to cause the return, or setting movement, of the arms 60 during the remaining 240 degrees of rotation of the cam, thereby insuring that there will be adequate time for the pawls 56 to engage in the proper ones of the ratchet teeth on the various members 50.

The cam 78 is driven from a motor 80 in the following manner. Secured to the cam 78 is a gear 81, which meshes with a gear 82 coupled to the housing 83 (Figs. 4 and 5) of a clutch. The housing 83 has a pawl 84 slidably mounted therein and normally urged toward engagement with a ratchet 85 by a spring-urged lever 86 pivoted to the housing at 87 and coupled to the pawl 84 by a pin 88. The ratchet 85 is driven continuously by the motor 80 through the shaft 89.

A clutch trip lever 95 is pivoted on a bracket 96 secured to the plate 75 and normally is in engaging relation with the free end of the lever 86, to hold the pawl out of engagement with the ratchet, thereby to interrupt the drive of the indicating means. A cam 97, formed on the housing 83, cooperates with a roller 98 on the end of a spring-urged lever 99 pivoted on the bracket 96 and locates the housing in its home position.

Whenever the clutch trip lever 95 is moved from engagement with the lever 86, the pawl 84 will be engaged with the ratchet 85 to couple the cam 78 to the motor. Unless the lever 95 is retained out of the path of the free end of the lever 86, the clutch will be disengaged after it has made one revolution.

The clutch trip lever 95 is connected by a link 105 to an arm 106 extending from an armature 107, which is pivoted at 108 and can be rocked clockwise (Fig. 4) upon the energization of a trip magnet 110 to move the lever 95 from engagement with the lever 86 and allow the clutch to be effective to couple the cam 78 to the motor. Accordingly, the energization of magnet 110 can initiate a cycle of operation of the indicating means first to restore the wheels to a predetermined position and thereafter to set them to the amount to be displayed.

Control circuits

In order that the invention may be explained more fully, the description of a preferred embodiment of the control circuits will be given, in which description values of potential and circuit elements, such as resistors and capacitors, will be given and types of tubes will be specified. It is not intended, however, to limit the invention to the embodiment described nor to limit the circuit values and tube types to those specified, because they are merely selected as illustrative. It will be obvious that other potentials and/or other similar tube types can be used and the circuit values of resistance and capacitance can be adjusted to maintain the proper relation between the various parts of the circuits. Throughout the circuit diagram, the heater elements for the tubes are shown conventionally.

The circuits for controlling the setting of the wheels 30 for a plurality of denominational orders and for controlling the cycling of the indicating means are shown in Fig. 6. In the circuit diagram, certain of the mechanical parts, which are shown elsewhere in the drawings and which control and are controlled by the circuits, are shown schematically.

The circuits for controlling the indicating means to control the setting of the wheels 30 according to the digits to be displayed will be considered first. In Fig. 6, the circuits for controlling the setting of three denominational orders of the indicating means are shown. Since the circuits for controlling the various orders are the same, their operation will be clear from a description of one of them. It also will be obvious that as many orders as desired can be provided.

The magnet 65, which, as explained earlier herein, controls the operation of pawl 56, is included in the anode circuit of triode 114 of a twin triode tube 115, the circuit extending from the anode 116 over resistor 117 of 4,000 ohms, magnet 65, and conductor 118 to terminal 119, to which is supplied a potential of +150 volts. The magnet 65 wil be energized whenever triode 114 conducts. The twin triodes disclosed in the preferred embodiment are those sold by Radio Corporation of America under the type designation 6J6. While twin triodes have been used in the control circuits because of their compactness, it will be obvious that two separate tubes can be used in place of each twin triode if desired.

The cathode 120, which is common to both triodes of the tube 115, is connected directly to ground.

The grid 121 of triode 114 has positive potential applied thereto over a circuit which extends from the grid over resistor 122 of 500 ohms, point 123, resistor 124 of 5 megohms, and conductor 125 to point 126 in a potential divider composed of resistor 127 of 30,000 ohms and resistor 128 of 3,900 ohms, which are connected between ground and conductor 129, to which a potential of +150 volts is applied from terminal 119. Point 123 in this circuit is also connected to the wiper switch 37, the contact element 38 of which engages the stator contacts successively to sense for the one having a negative potential supplied thereto.

As explained earlier herein, potentials will be applied to the stator contacts, and that contact which corresponds to the digit to be made apparent will be less positive than any of the other contacts. The bias supplied to the grid 121 is so adjusted that the triode 114 will conduct except when the contact having this least positive potential is sensed. In the disclosed embodiment, the relation between the potentials used is such that the contact corresponding to the digit to be made apparent will have a negative potential, and the remaining contacts will be at positive potential. This negative potential, when applied to the grid 121, will cut off conduction in triode 114 and de-energize the magnet 65, which then allows the pawl 56 to engage the ratchet teeth on the member 50 to arrest the member with the wheel 30 in position to display the corresponding digit. The digit-representing potentials can be applied to the contacts on the stator from potential supply means shown diagrammatically in Fig. 6. The digit-representing potential supply means may consist of any suitable means, one such means being a resistance network controlled from an accumuator as shown in the co-pending United States patent application of Carl F. Rench, Serial No. 133,540, which was filed on December 17, 1949 now Patent No. 2,591,007.

The functioning of the circuit in a cycle of operation of the indicating means is as follows. At the end of the preceding cycle of operation of the indicating means, the wiper contact element will remain on the contact on the stator which had the negative potential, and triode 114 will remain at cut-off, which deenergizes magnet 65. As soon as negative potential is removed from the grid 121, either by a change in the digit to be displayed or by the restoring movement of the wiper arm from the contact having the negative potential, triode 114 will again conduct and energize magnet 65. When the pawl 56 is cammed from the ratchet during the restoring movement of the setting control member 50, as explained earlier herein, the magnet 65 will attract the pawl and retain it out of engagement with the ratchet. During the setting movement of the setting control member 50 and the wheel 30 and the wiper switch 37, geared thereto, the magnet 65 will retain the pawl 56 out of engagement with the ratchet until the contact element 38 on the wiper switch engages the contact on the stator to which a negative potential has been applied. This negative potential will cause the triode 114 to cease conducting, thereby deenergizing the magnet 65 and allowing the spring 59 to move the pawl into engagement with the ratchet to arrest further movement of the member 50, which has positioned wheel 30 with the required digit in reading position.

In a similar manner, the control circuits related to other denominational orders will be effective to control the setting of the wheels 30 in these orders according to which contacts in these orders the negative control potential is applied to.

The circuits for controlling the cycling of the indicating means will now be considered.

Triode 135, which is the other triode of twin triode 115, has its anode 136 connected over conductor 137, point 138, conductor 139, clutch trip magnet 110, and conductor 129, to terminal 119, to which the potential of +150 volts is supplied. Whenever triode 135 conducts, magnet 110 will be energized to operate the clutch trip lever 95 (Fig. 4) and allow the pawl 84 to engage the ratchet 85 and drive the cam 78.

Grid 140 of triode 135 is connected to the same potential supply circuit as grid 121 of triode 114 and controls triode 135 in the same manner as grid 121 controls triode 114. Accordingly, whenever the wiper switch is not on a contact having negative potential, triode 135 will conduct and will energize magnet 110 to cause the drive for the indicating means to be operable.

In a similar manner, the anode of one of the triodes of each of the twin triodes of other denominational orders is connected to conductor 137, so that, if any change occurs in the digit to be made apparent in any denominational order, the clutch will be operated to connect the drive to the indicating means. In the setting portion of the cycle, the various setting control members 50 will be arrested with their related wiper switches 37 engaging contacts having negative potentials applied thereto, and all the triodes will be at cut-off. This will cause the magnet 110 to be deenergized and allow the clutch trip lever 95 to disengage the clutch.

If, for any reason, one of the pawls as 56 fails to stop its setting control member 50 in one of the positions "0" to "9," the wiper switch 37 will engage the contact 40, which is connected to a positive potential, and the related triodes will continue to conduct, energizing magnet 110 to cause another cycle of operation to take place. Similarly, if the pawl stops the setting control member 50 in a position different from that of the digit which should have been displayed, the wiper switch in that order will not be on a contact having negative potential, and the related triodes will continue to conduct and cause another cycle of operation of the indicating means to take place.

While the control of the positioning of the wheels 30 and the recycling of the indicating means has been described above as being responsive to the least positive (or negative) potential, the invention is not limited to this control, because it is obvious that, by using an inverter tube between each wiper switch and its related point 123, triodes as 114 and 135 can be made non-conducting when the wiper switch engages a contact which is most positive and causes the inverter tube to operate and make the point 123 go negative.

In the embodiment disclosed, the drive for the cam 78 is such that two revolutions of the clutch are necessary for one revolution of the cam 78. To insure that the second revolution of the clutch will take place, the pitman 72 will engage a roller 142 (Figs. 2 and 6), which will close contacts 143 near the end of the first revolution of the clutch to ground conductor 137 and energize the magnet 110, and will maintain the contacts closed until after the second revolution of the clutch has begun.

Whenever the trip magnet 110 is energized and the indicating means is cycling, a contact 145 (Figs. 4 and 6) is closed by the armature of the magnet to close a circuit which provides a signal that the indicating means is operating. This signal circuit is also closed by a contact 146, which is operated by cam 78 during the first 120 degrees, or restoring portions of the cycle, to insure that the operating signal will not be interrupted even if the magnet 110 should be deenergized momentarily during the restoring portion of the cycle.

It is clear from the above description that a small, compact, high-speed indicating means has been provided, which indicating means embodies unit construction to enable ready replacement and servicing to be obtained and also contains novel controls which will automatically initiate a cycle of operation upon a change in the data to be indicated or upon a disagreement of the indicated data and that which should be indicated.

While the device shown and described herein is admirably adapted to fulfill the objects primarily stated, it is to be understood that it is not intended to confine the invention to the one form or embodiment herein disclosed, for it is susceptible of embodiment in various other forms.

What is claimed is:

1. In a cyclically operable indicating means, the combination of means to represent data by potentials applied to potential points corresponding to the possible data which may be made apparent, the point corresponding to the particular datum to be made apparent having a potential distinctive from the rest; sensing means movable past the potential points to sense the potential points for the one with the distinctive potential; driving means cyclically operable in an operation of the indicating means to first operate the sensing means in a restoring operation to a predetermined position and thereafter operate it in a setting operation; means controlled by the sensing means and operable in an operation of the indicating means to arrest the sensing means in the setting operation thereof in the position in which the sensing means senses the point with the distinctive potential, to thereby indicate the datum represented by the point having the distinctive potential applied thereto; and means controlled by the sensing means automatically to initiate a cycle of operation of the driving means for the indicating means upon a change in the point to which the distinctive potential is applied.

2. In a cyclically operable indicating means, the combination of means to represent data by potentials applied to potential points corresponding to the possible data which may be made apparent, the point corresponding to the particular datum to be made apparent having a potential distinctive from the rest; means to sense the potential points for the one with the distinctive potential; driving means cyclically operable in an operation of the indicating means to first operate the sensing means in a restoring operation to a predetermined position and thereafter operate it in a setting operation; a ratchet coupled to the sensing means to be movable therewith; a pawl engageable with the ratchet to arrest the sensing means in the setting operation thereof as it senses said potential points; an electromagnet cooperable with the pawl to control its engagement with the ratchet; an electronic device controlling the energization of the magnet and thereby controlling the engagement of the pawl with the ratchet; and means coupling the electronic device to the sensing means for control thereby to govern the energization of the magnet so as to control the engagement of the pawl with the ratchet to arrest the sensing means, in the setting operation thereof, in the position in which the sensing means senses the point with the distinctive potential, to thereby indicate the datum represented by the point having the distinctive potential.

3. In a cyclically operable indicating means, the combination of means to represent data by potentials applied to potential points corresponding to the possible data which may be made apparent, the point corresponding to the particular datum to be made apparent having a potential distinctive from the rest; means to sense the potential points for the one with the distinctive potential; driving means cyclically operable in an operation of the indicating means to first operate the sensing means in a restoring operation to a predetermined position and thereafter operate it in a setting operation; a ratchet coupled to the sensing means to be movable therewith; a pawl engageable with the ratchet to arrest the sensing means in the setting operation thereof as it senses said potential points; an electromagnet cooperable with the pawl and energizable to maintain the pawl from engagement with the ratchet in the setting operation of the sensing means; an energizing circuit for said magnet including an electronic device, said magnet being energized whenever conduction occurs in the device; means coupling the electronic device to the sensing means for control thereby to cause the electronic device to conduct, in the setting operation of the sensing switch, until the sensing device engages the point having the distinctive potential, which potential will cause conduction to cease in the electronic device to deenergize the magnet and allow the pawl to engage the ratchet and arrest the sensing means on the point having the distinctive potential applied thereto, to thereby indicate the datum represented by that point; and means to initiate a cycle of operation of the indicating means.

4. A device as claimed in claim 3 in which the means to initiate a cycle of operation includes an electronic device, and circuits connecting the electronic device to the sensing means for control thereby to cause the electronic device to change its conducting-non-conducting status to initate a cycle of operation whenever said distinctive potential is removed from the potential point on which the sensing means has been arrested.

5. In a cyclically operable digit-indicating means, the combination of means to represent digits by potentials applied to digit-representing contacts corresponding to possible digits which may be displayed, the point corresponding to the particular digit to be displayed having a potential which is distinctive from the rest; an indicating device having said digits thereon and settable to position any of said digits in reading position; means operable to engage the digit-representing contacts in sequence to sense the contacts for the one having the distinctive potential; means coupling the indicating device and the sensing means for synchronous movement so that the digit will be in reading position when the sensing means engages the corresponding digit-representing contact; driving means cyclically operable in an operation of the indicating means to first operate the indicating device and the sensing means in a restoring operation to a predetermined position and thereafter operate them in a setting operation; a ratchet coupled to the indicating device and the sensing means and operable therewith; a pawl selectively engageable with the ratchet; an electro-magnet cooperable with the pawl to control its engagement with the ratchet; an energizing circuit for the magnet, said circuit including an electronic device whose conducting and non-conducting conditions control the energization of the magnet; means coupling the electronic device to the sensing means for control thereby during the setting operation of the indicating device and the sensing means to change the conducting status of the electronic device when the sensing means engages the digit-representing contact to which the distinctive potential is applied, thereby to control the magnet and enable the pawl to engage the ratchet to arrest the sensing device in position in which it engages the contact to which the distinctive potential is applied and to arrest the indicating device in position to display the corresponding digit; and means to initiate a cyclic operation of the indicating means.

6. In a cyclically operable indicating means, the combination of a plurality of devices, each operable to make apparent selectively any of predetermined data; a plurality of data-representing contacts for each device; means to apply potentials to the data-representing contacts, the contacts corresponding to the particular data to be represented having a potential which is distinctive from that of their other related data-representing contacts; means operable in a cyclic operation of the indicating means to sense the pluralities of data-representing contacts for those having the distinctive potential; means controlled by the sensing means and operable in a cycle of operation of the indicating means to cause the devices to operate to make that data apparent which corresponds to the data-representing contacts to which the distinctive potential is applied;

and means controlled by the sensing means to initiate a cycle of operation of the indicating means automatically whenever the data which is represented by the distinctive potential applied to the data-representing contacts in any of the plurality of contacts is different from the data which is being made apparent by their related devices.

7. In a cyclically operable indicating means, the combination of a plurality of indicating devices, each positionable to place any of predetermined data in reading position; a plurality of sets of data-representing contacts, one set for each device and each set containing a plurality of data-representing contacts; means to apply potentials to the contacts, the contact in each set which corresponds to the data to be represented having a potential which is distinctive from that applied to the other contacts; a sensing switch for each set of contacts, said sensing switches operable to engage the contacts to locate the ones with the distinctive potential; means to operate the sensing means and the indicating devices in unison first in a restoring operation and then in setting operations; means controlled by the sensing means and operable in the setting operation to cause the indicating devices to be positioned to display data corresponding to that represented by the contacts to which the distinctive potential is applied; means to drive the operating means; means operable to couple the driving means to the operating means; and initiating means to cause the coupling means to operate to cause an operation of the indicating means, said initiating means including an electronic device for each sensing switch coupled to its related switch to be controlled thereby, and a coupling-effecting means operated from any of the electronic devices to cause a cycle of operation to be initiated whenever any one of the switches engages a contact which does not have the distinctive potential applied thereto and causes its related electronic device to change its conducting-non-conducting status.

8. A multi-denominational order indicator having a common driving means for all orders and having in each order the combination of an indicating wheel rotatable to place indicia thereon in reading position; a sensing means having a plurality of stationary contacts, one for each of the possible datum to be displayed, and a wiper switch movable to engage the stationary contacts, one after another; means coupling the wheel and the wiper switch for joint movement and cooperable with the driving means to be driven thereby to positively restore the wheel and the wiper switch to a predetermined position from any previously set position near the beginning of a cycle of operation of the indicator; yieldable means to drive the wheel and the wiper switch in a setting operation in which they may be set to any one of a plurality of positions; electromagnetically controlled means for arresting the wheel and the wiper in any of said positions in a setting operation; means coupled to the stationary contacts to supply data-representing potentials thereto, the contact corresponding to the datum to be displayed having a potential supplied thereto which is distinctive from the potential supplied to the other contacts; control means coupled to the wiper switch and to the electromagnetically controlled means to be controlled by the wiper switch and to control the energization of the magnet to cause the wiper switch to be arrested on the contact having the distinctive potential and the wheel to be arrested in position to display the corresponding datum; and plug and socket connectors in the couplings between the means to supply potentials to the stationary contacts and the contacts and in the couplings between the control means and the wiper switch and electromagnetically controlled means; said wheel, sensing means and their coupling means and yielding drive and the electromagnetically controlled means forming a unit which is mounted on a supporting plate which is readily removable to permit the unit to be removed or replaced and said plug and socket connectors allowing the ready disconnection of the elements of the unit from their potential supplies and control means.

9. In a device of the class described, the combination of a differentially settable member; means to positively drive the member to restore it from any set position to a predetermined position; means to yieldingly drive the member in a setting operation to positions in which it may be arrested; ratchet teeth on the member; a pawl normally urged into selective engagement with any desired one of the ratchet teeth to arrest the member, as it is being yieldingly driven, to set the member in a desired position; a magnet cooperable with the pawl to control its engagement with the ratchet teeth, said magnet when energized being ineffective to remove the pawl from the teeth but being capable of attracting the pawl and retaining it from the teeth once the pawl is moved into proximity to the magnet, and said ratchet teeth being operable to move the pawl into proximity to the magnet during the restoring movement of the member; and means for energizing the magnet during the restoring movement of the member and maintaining it energized through the setting movement of the member until the pawl is to be released to engage the required one of the ratchet teeth to arrest the member in the desired set position thereof.

10. A device as claimed in claim 9 in which the means for energizing the magnet and for maintaining it energized until the pawl is to be released, includes an electronic device in the circuit with the magnet to cause the magnet to be energized whenever the electronic device conducts, and a control for the electronic device, which control includes a plurality of contacts having potentials applied thereto, one of which potentials is distinctive from that of the others and will cause the electronic device to cease conducting and deenergize the magnet, and includes a sensing switch operated in synchronism with the member to sense the contacts and control the electronic device according to the potentials to cause the electronic device to be rendered non-conducting to deenergize the magnet in the setting movement of the member when the switch engages the contact corresponding to the position in which the member is to be set and to which the distinctive potential has been applied.

11. In a cyclically operable indicating means, the combination of means to represent data by potentials applied to potential points corresponding to the possible data which may be made apparent, the point corresponding to the particular datum to be made apparent having a potential distinctive from the rest; means to sense the potential points for the one with the distinctive potential; driving means cyclically operable in an operation of the indicating means to first operate the sensing means in a restoring operation to a predetermined position and thereafter operate it in a setting operation; potential-sensitive means controlled by the sensing means to distinguish the differences between the applied potentials and operate in an operation of the indicating means to arrest the sensing means in the setting operation thereof in the position in which the sensing means senses the point with the distinctive potential, to thereby indicate the datum represented by the point having the distinctive potential applied thereto; and potential-sensitive means controlled by the sensing means automatically to initiate a cycle of operation of the driving means for the indicating means when the distinctive potential is removed from the point on which the sensing means is arrested.

JACK I. KERN.

REFERENCES CITED

The following references are of record in the file of this patent:

UNITED STATES PATENTS

| Number | Name | Date |
| --- | --- | --- |
| 2,103,297 | Nelson et al. | Dec. 28, 1937 |
| 2,279,232 | Graham | Apr. 7, 1942 |